Sept. 7, 1965  H. C. LAWRENCE ETAL  3,204,912
VIBRATION-DAMPING AND LOAD-SUPPORTING APPARATUS
Filed Dec. 3, 1962  2 Sheets-Sheet 1

INVENTORS
HAROLD C. LAWRENCE
LOUIS C. HOCH

INVENTORS
HAROLD C. LAWRENCE
LOUIS C. HOCH

United States Patent Office 3,204,912
Patented Sept. 7, 1965

3,204,912
VIBRATION-DAMPING AND LOAD-SUPPORTING APPARATUS
Harold C. Lawrence, Pequannock, and Louis C. Hoch, Nutley, N.J., assignors to Aeroflex Laboratories Incorporated, a corporation of Delaware
Filed Dec. 3, 1962, Ser. No. 241,784
5 Claims. (Cl. 248—358)

This invention relates to vibration-damping and load-supporting apparatus and, while it is of general application, it is particularly useful in interconnecting supporting and supported members by an assembly including two elongated sheet metal strips while substantially eliminating the transmission of shock and vibration forces between them and will be specifically illustrated and described in such an application.

Heretofore, there have been proposed certain vibration-damping and load-supporting apparatus including lengths of stranded wire cable or rope extending between two rectilinear clamping or securing strips, the support being provided by the stiffness of the short lengths of stranded cable. However, in such prior apparatus of this type, the damping of the vibrations has been effected primarily by supplementary elastic material, such as rubber or synthetic plastic material having similar elastic properties. Such prior supporting apparatus have generally been complex, costly, and relatively heavy, and have inherently had spring constants unsuitable for light loads, such as certain precision electronic chassis, and have been incapable of isolation to the degree required to prevent injury to such delicate apparatus.

It is an object of the invention, therefore, to provide a new and improved vibration-damping and load-supporting apparatus for interconnecting two members while substantially eliminating the transmission of shock and vibration forces therebetween.

In accordance with the invention, there is provided a vibration-damping and load-supporting apparatus for interconnecting a supporting member and a supported member comprising a pair of elongated substantially rigid strips, each adapted to be connected to one of the supporting and supported members, a plurality of loops of standard wire cable extending between the strips, and means for attaching opposed mid-points of the loops to the pair of strips with the curved portions thereof extending from either side of the points of attachment.

For a better understanding of the present invention, together with other and further objects thereof, reference is had to the following description, taken in connection with the accompanying drawings, while its scope will be pointed out in the appended claims.

Referring now to the drawings:

FIG. 4 is a fragmentary view of a modification of the apparatus of FIG. 1 capable of substantially eliminating the transmission of shock and vibration forces in all three coordinate directions, while

Figure 1:
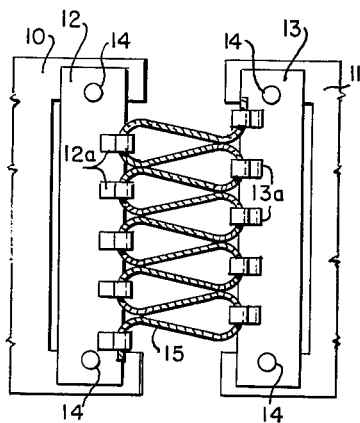
FIG. 1 is a view in elevation of a vibration-damping and load-supporting apparatus embodying the invention in normal or unstressed condition.

Referring now more particularly to FIG. 1 of the drawings, there is illustrated a vibration-damping and load-supporting apparatus embodying the invention for interconnecting a supporting member 10 and a supported member 11 comprising a pair of elongated substantially rigid sheet metal strips 12 and 13 having a plurality of tabs 12a, 12a and 13a, 13a extending from their respective edges. The elongated strips 12 and 13 may be integral with the supporting member 10 and the supported member 11 or, as shown, adapted to be connected to the members 10 and 11, respectively, as by suitable rivets 14 or equivalent.

The apparatus of FIG. 1 further comprises a plurality of loops of stranded wire cable extending between the strips 12 and 13, the loops being either separate and discrete or, as shown, a continuous length of stranded wire cable 15 formed into a plurality of loops extending between the strips 12 and 13. These loops are disposed and formed so that portions of adjacent loops are in frictional contact, as shown.

The apparatus of FIG. 1 further comprises means for attaching the opposed mid-points of the loops tangentially to the strips 12 and 13 with the curved portions thereof extending from either side of the points of attachment, this means being in the form of the tabs 12a and 13a which are bent over or otherwise deformed to secure the mid-points of the loops to their respective strips.

Figure 2:
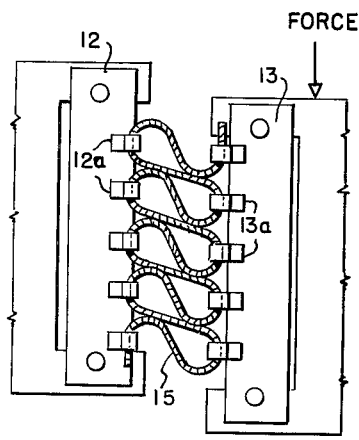
FIG. 2 is a view in elevation of the apparatus of FIG. 1 deflected in response to the application of a longitudinal force by one of the members.

It is believed that the operation of the apparatus of FIG. 1 in substantially eliminating the transmission of shock and vibration forces from the supporting member 10 to the supported member 11 will be apparent from the foregoing description. The deflection of the apparatus in response to a vertical force applied by the member 13 is shown in FIG. 2. The cable 15 is initially prestressed by bending it to form the series of loops and, as it is deflected to the form shown in FIG. 2, certain portions of the cable are additionally stressed, providing a resistance to the applied force. The damping action is dependent both upon the interstrand friction in the cable 15 upon its deflection as well as upon the frictional engagement of the portions of the adjacent loops of the strand.

Figure 3:
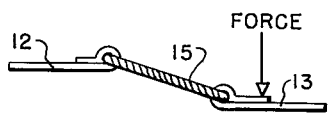
FIG. 3 is an end view of the apparatus of FIG. 1 deflected in response to a transverse force applied by one of the members.

The deflection of the apparatus of FIG. 1 in response to a transverse force is shown in the end view of FIG. 3. Due to the fact that the extremities of the loops are securely clamped by the deformed tabs 12a and 13a, the deflection shown in FIG. 3 results in a torsional stressing of the various loops of cable.

Figure 4:
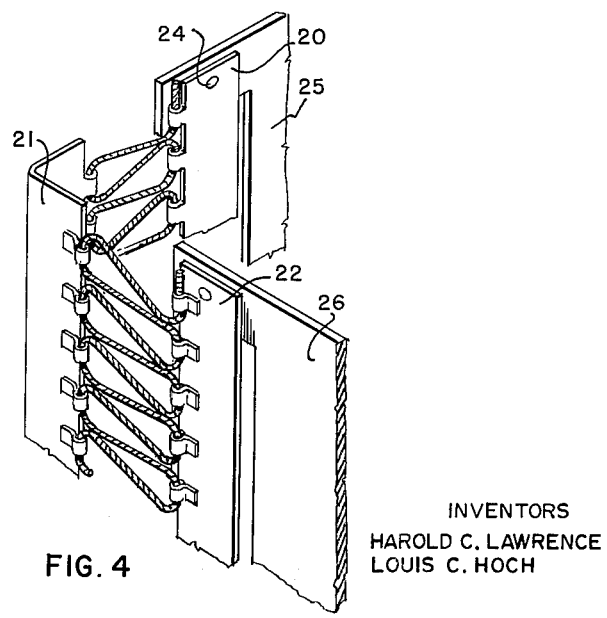

In FIG. 4, there is illustrated a modification of the invention effective substantially to eliminate transmission of shock and vibration forces in all three coordinate directions. In this embodiment of the invention, the apparatus includes three elongated strips 20, 21, and 22, the intermediate strip 21 being of angular cross-section, usually a right-angle section and free floating, while the pair of outer strips 20 and 22 are adapted to be connected to a supported member 26 and a supporting member 25. In this case, the loops of stranded wire cable extend between the intermediate strip 21 and each of the outer strips 20 and 22 and are secured thereto in the same manner as in the apparatus of FIG. 1. The operation of the vibration-damping and load-supporting apparatus of FIG. 4 is in all respects similar to that of FIG. 1 described above but, since it essentially comprises two of the FIG. 1 apparatus in mutually perpendicular planes, it is capable of absorbing shock and vibration forces in all three coordinate directions. Alternatively, the apparatus of FIG. 4 may be comprised of two of the apparatus of FIG. 1 attached to the legs of an angle element similar to element 21, excluding tabs.

The vibration-damping and load-supporting apparatus of the invention may be designed to accommodate a wide range of loads and vibration frequencies. One such design which has proved satisfactory in the support of light loads of a few pounds included strips 12 and 13 spaced by ¾ inch, between which extended 8 loops of stainless steel stranded cable of diameter of 1/16 inch and of 7 by 19 strands.

Figure 5:
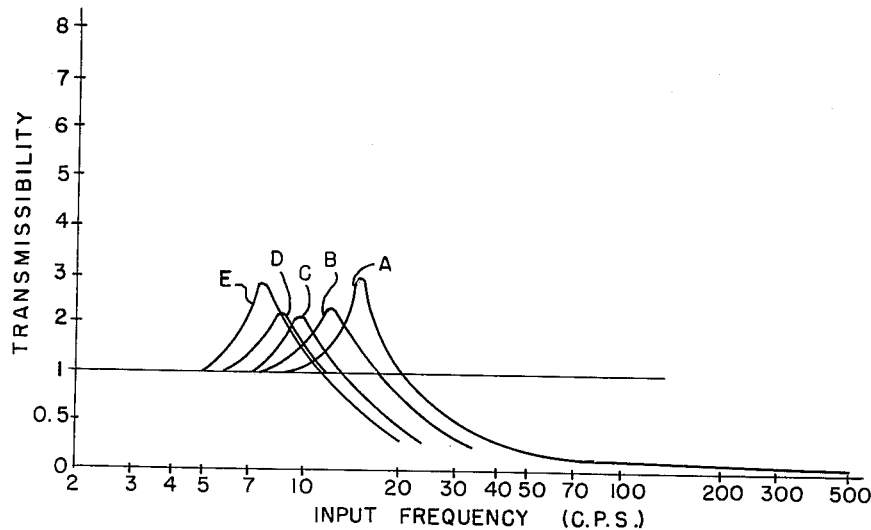
FIGS. 5 and 6 are curves illustrating certain operating characteristics of the apparatus of FIG. 1.

In FIG. 5 are represented the frequency-transmissibility characteristics of apparatus of the type shown in FIG. 4, each of the cable loop systems having the foregoing design constants, for vibration forces in the vertical direction, as seen in FIG. 4. The damping characteristics represented by Curves A, B, C, D, and E are with respect to a load of 2.5 pounds for sinusoidal vibration inputs of 0.015, 0.030, 0.060, 0.090, and 0.120 inch peak-to-peak amplitude, respectively, and supported by four units of the type shown in FIG. 4. It will be noted that the highest natural resonant frequency for vibration forces in this direction is at approximately 15 cycles per second.

Figure 6:
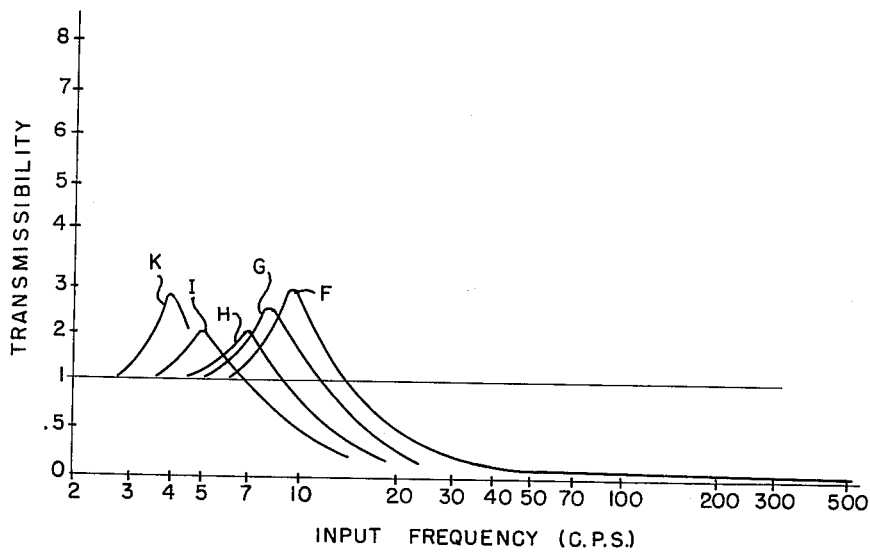

In FIG. 6, curves F, G, H, I, and K represent corresponding characteristics of the apparatus of FIG. 4 having the foregoing design constants for the application of transverse forces, as viewed in FIG. 4. From these curves, it will be noted that the highest natural resonant frequency is just under 10 cycles per second while the apparatus has a transmissibility of unity at a maximum frequency of approximately 15 cycles per second. Thus, it will be seen from the curves of FIGS. 5 and 6 that the apparatus will effectively isolate the supported member 26 for all shock and vibration frequencies substantially above 20 cycles per second. Other apparatus of the type shown in FIGS. 1 and 4 have been designed to have, with their supported load, natural resonant frequencies as low as 3 cycles per second and as high as 80 cycles per second, indicating the wide range of natural frequencies attainable, depending upon the size of cable, size of loops, weight of supported member, and number of loops.

An important advantage of the supporting apparatus described is that they perform their load-supporting and vibration-damping functions regardless of attitude or orientation, that is, the supported mass may be inverted vertically or tilted to any intermediate position without affecting the performance of the supporting apparatus. Many currently available vibration isolators are effective only when maintained in a fixed plane and lose their isolating capability when inverted or turned on their side, due to the phenomenon normally described as bottoming out against the isolator structure itself.

While there have been described what are, at present, considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A vibration-damping and load-supporting apparatus for interconnecting a supporting member and a supported member comprising:
   (a) a pair of elongated substantially rigid strips, each adapted to be connected to one of said members;
   (b) a plurality of loops of stranded wire cable extending between said strips;
   (c) and means for attaching opposed midpoints of said loops to said pair of strips with the curved portions thereof extending from either side of the points of attachment.

2. A vibration-damping and load-supporting apparatus for interconnecting a supporting member and a supported member comprising:
   (a) a pair of elongated substantially rigid sheet metal strips, each having a plurality of tabs extending from one edge thereof and each adapted to be connected to one of said members;
   (b) and a plurality of loops of stranded wire cable extending between said strips, said tabs being deformed to attach opposed midpoints of said loops to said pair of strips with the curved portions thereof extending from either side of the points of attachment.

3. A vibration-damping and load-supporting apparatus for interconnecting a supporting member and a supported member comprising:
   (a) a pair of elongated substantially rigid strips, each adapted to be connected to one of said members;
   (b) a continuous length of stranded wire cable formed into a plurality of loops extending between said strips;
   (c) and means for attaching opposed midpoints of said loops to said pair of strips with the curved portions thereof extending from either side of the points of attachment.

4. A vibration-damping and load-supporting apparatus for interconnecting a supporting member and a supported member comprising:
   (a) a pair of elongated substantially rigid strips, each adapted to be connected to one of said members;
   (b) a plurality of loops of stranded wire cable extending between said strips, said loops being disposed so that portions of adjacent loops are in frictional contact;
   (c) and means for attaching opposed midpoints of said loops to said pair of strips with the curved portions thereof extending from either side of the points of attachment.

5. A vibration-damping and load-supporting apparatus for interconnecting a supporting member and a supported member comprising:
   (a) three elongated substantially rigid strips including an intermediate free-floating strip of angular cross-section and a pair of outer strips adapted to be connected individually to said members;
   (b) a plurality of loops of stranded wire cable extending between said intermediate strip and each of said outer strips;
   (c) and means for attaching opposed midpoints of said loops to said pair of strips with the curved portions thereof extending from either side of the points of attachment.

References Cited by the Examiner

UNITED STATES PATENTS 2,493,788   1/50   Turlay _____ 248—358 X
3,065,959   11/62  Kerley et al. _____ 248—358 X FRANK L. ABBOTT, *Primary Examiner.*